(12) United States Patent
Benitsch et al.

(10) Patent No.: US 10,371,432 B2
(45) Date of Patent: Aug. 6, 2019

(54) FRESHNESS-PRESERVING CONTAINER FOR FOOD WITH A LOW-PRESSURE GENERATING UNIT, AND DOMESTIC REFRIGERATOR WITH SUCH A FRESHNESS-PRESERVING CONTAINER

(71) Applicant: BSH HAUSGERAETE GMBH, Munich (DE)

(72) Inventors: Roland Benitsch, Nattheim (DE); Juergen Fink, Gerstetten (DE); Bernd Pfister, Ulm (DE)

(73) Assignee: BSH Hausgeraete GmbH, Munich (DE)

( * ) Notice: Subject to any disclaimer, the term of this patent is extended or adjusted under 35 U.S.C. 154(b) by 60 days.

(21) Appl. No.: 15/516,460

(22) PCT Filed: Sep. 30, 2015

(86) PCT No.: PCT/EP2015/072576
§ 371 (c)(1),
(2) Date: Apr. 3, 2017

(87) PCT Pub. No.: WO2016/050852
PCT Pub. Date: Apr. 7, 2016

(65) Prior Publication Data
US 2018/0195787 A1      Jul. 12, 2018

(30) Foreign Application Priority Data
Oct. 2, 2014   (DE) ........................ 10 2014 219 999

(51) Int. Cl.
*F25D 17/04*      (2006.01)
*F25D 23/02*      (2006.01)
(Continued)

(52) U.S. Cl.
CPC .......... *F25D 17/042* (2013.01); *A23L 3/3418* (2013.01); *A23L 3/363* (2013.01);
(Continued)

(58) Field of Classification Search
CPC ...... F25D 17/042; F25D 17/08; F25D 23/028; F25D 23/04; F25D 2317/043; A23L 3/363; A23L 3/3418
See application file for complete search history.

(56) References Cited

U.S. PATENT DOCUMENTS 2,116,813 A * 5/1938 O'N Weisser ......... A23B 4/066
                                                             292/DIG. 71
4,387,578 A * 6/1983 Paddock ................. F25D 29/00
                                                             165/11.1
(Continued)

FOREIGN PATENT DOCUMENTS

CN       1888787 A *   1/2007
DE       3212753 A1   12/1983
(Continued)

*Primary Examiner* — Emmanuel E Duke
(74) *Attorney, Agent, or Firm* — Laurence A. Greenberg; Werner H. Stemer; Ralph E. Locher (57) ABSTRACT

A freshness-preserving container for food, includes a shell with a cover which can be sealingly placed on the shell. The freshness-preserving container has a mechanically operating low-pressure generating unit with which an air pressure that is reduced compared to the surrounding area outside of the freshness-preserving container can be adjusted in the freshness-preserving container. The low-pressure generating unit has an actuating element which can be moved relative to the freshness-preserving container, and air can be suctioned out of the freshness-preserving container dependent on the movement of the actuating element. A domestic refrigerator including a freshness-preserving container is also provided.

15 Claims, 4 Drawing Sheets

(51) Int. Cl.
  *A23L 3/3418* (2006.01)
  *A23L 3/36* (2006.01)
  *F25D 23/04* (2006.01)

(52) U.S. Cl.
  CPC ........ *F25D 23/028* (2013.01); *A23V 2002/00* (2013.01); *F25D 23/04* (2013.01); *F25D 2317/043* (2013.01)

(56) References Cited

U.S. PATENT DOCUMENTS

| | | | | |
|---|---|---|---|---|
| 5,271,240 | A | * | 12/1993 | Detrick ................. F25D 17/042 62/268 |
| 5,398,811 | A | * | 3/1995 | Latella, Jr. ............... A47J 47/04 206/524.8 |
| 6,090,422 | A | * | 7/2000 | Taragan ................. A23L 3/0155 426/231 |
| 6,598,517 | B1 | * | 7/2003 | McCausland ......... A23L 3/3418 141/65 |
| 2008/0302114 | A1 | * | 12/2008 | Kelly .................... F25D 17/042 62/170 |
| 2012/0146477 | A1 | | 6/2012 | Bischofberger et al. |
| 2014/0028166 | A1 | | 1/2014 | Park et al. |

FOREIGN PATENT DOCUMENTS

| | | |
|---|---|---|
| DE | 4040341 C2 | 5/1994 |
| JP | 2005055031 A | 3/2005 |
| WO | 2011026749 A2 | 3/2011 |
| WO | 2011072353 A2 | 6/2011 |

\* cited by examiner

FRESHNESS-PRESERVING CONTAINER FOR FOOD WITH A LOW-PRESSURE GENERATING UNIT, AND DOMESTIC REFRIGERATOR WITH SUCH A FRESHNESS-PRESERVING CONTAINER

BACKGROUND OF THE INVENTION

Field of the Invention

The invention relates to a freshness-preserving container for food, having a shell and a cover which can be placed on the shell to form a seal. Furthermore the invention also relates to a domestic refrigerator with a freshness-preserving container of this type.

Freshness-preserving containers of this type are known from the prior art, in which a different moisture content can be applied to the introduced food as a function of a position of the cover in relation to the shell. Freshness-preserving containers of this type are known for instance from WO 2011/026749 A2 or DE 40 40 341 C2.

Furthermore, freshness-preserving containers for use in a receiving compartment of a domestic refrigerator are however also known, in which a low pressure can be generated in the freshness-preserving container using an electrically operating pump. These embodiments are very expensive and furthermore also installation space-intensive, since corresponding space is required for an electrically operating pump of this type. Furthermore, these electric pumps in the surrounding area in the domestic refrigerator are relatively functionally susceptible or must however be arranged outside of the receiving compartment in an area that is exposed to the lowest possible temperature fluctuations, which, in turn however, requires extensive cabling and connection with the freshness-preserving container, which in turn results in an at least increased assembly outlay.

SUMMARY OF THE INVENTION

The object of the present invention is to create both a freshness-preserving container for food and also a domestic refrigerator, in which the generation of a low pressure in the freshness-preserving container can be carried out more easily.

This object is achieved by a freshness-preserving container and a domestic refrigerator according to the independent claims.

An inventive freshness-preserving container for food comprises a shell and a cover which can be placed on the shell to form a seal. One essential idea behind the invention is that the freshness-preserving container has a mechanically operating low-pressure generating unit, with which an air pressure that is reduced compared to the surrounding area outside of the freshness-preserving container can be adjusted in the freshness-preserving container. The low-pressure generating unit has at least one actuation element, which can be moved mechanically relative to the freshness-preserving container and can thus in particular only be actuated mechanically, and wherein air can be suctioned out of the freshness-preserving container in order to set the reduced air pressure, as a function of the movement of this actuation element. An embodiment of a freshness-preserving container of this type with a low-pressure generating unit which operates purely and exclusively mechanically simplifies the design significantly and thus permits a highly functional embodiment. A more compact design can be achieved in this respect. A low-pressure generating unit of this type which operates exclusively mechanically is also more robust with respect to the ambient conditions in a domestic refrigerator, requires no electrical cabling and no electric power supply.

Since the low-pressure generating unit also has a moveable mechanical actuation element, it is very easy to operate and furthermore also durably functional.

Provision is preferably made for the low-pressure generating unit to have a linearly displaceable piston as the actuation element. This is thus advantageous in that a simple actuation path of the actuation element is predetermined by a straight displacement movement of this type and as a result an unwanted jamming or bracing is also avoided. The suctioning-in of the air volume from the freshness-preserving container in order to generate a reduced air pressure is as a result also very uniform and continuously possible. A pusher is furthermore also created by the embodiment of the actuation element as a piston, which permits, relatively quickly, a relatively large volume to be suctioned out of the freshness-preserving container. Furthermore, a piston of this type is also a mechanically stable component, which durably withstands the developing forces and loads and also withstands these requirements and permits no leakages when the pressure setting in the freshness-preserving container is significantly reduced.

Provision is preferably made for the low-pressure generating unit to be embodied as a mechanically operating pump, which operates in particular exclusively mechanically and has an actuation element embodied as a piston, wherein this piston is displaceably mounted in an actuation element housing, embodied as a piston housing, of the pump. As a function of the displacement of the piston the air can be suctioned out of the freshness-preserving container, in order to set the reduced air pressure. This is a very preferred embodiment, since a very simple and thus highly functional design is realized by a pump of this type which operates exclusively mechanically, in particular in respect of the active principle of an air pump. The afore-cited advantages appear to a significant degree in this embodiment. By means of this embodiment the piston is also protected and surrounded and can also be guided through the piston housing in an accurately-fitting and targeted manner, so that the linear displacement in particular of the piston is achieved particularly advantageously. Furthermore, the desired air quantity can also be rapidly and extensively suctioned in by means of this embodiment with a piston housing, and no leakages appear on account of the specific guidance of the piston in the piston housing, even with an extensive air suction from the freshness-preserving container.

Provision is preferably made for the low-pressure generating unit to be integrated into the freshness-preserving container. A very compact position-tolerance-free module can in effect thus be created by means of this embodiment. The coupling is as a result likewise already integrated and extremely short paths develop between the low-pressure generating unit and the freshness-preserving container so that the suctioning can be carried out particularly promptly and thus directly.

Provision can also be made for the low-pressure generating unit to be removably detachable from and reattached to the freshness-preserving container in a non-destructive manner. This is thus advantageous in that for assembly purposes or maintenance work, the accessibility to the shell and/or the cover on the one hand and to the low-pressure generating unit on the other hand is improved. In particular, an advantage can also be achieved for cleaning purposes of the said components.

Provision is made particularly advantageously for the low-pressure generating unit to be received or arranged in a recess in the freshness-preserving container. As a result, a very compact design of this module can be achieved and the low-pressure generating unit can also be arranged protected to a certain degree. In particular, provision can be made for the low-pressure generating unit to be received or arranged in this recess without projecting in respect of the dimensions of the freshness-preserving container. This therefore means that the recess is dimensioned such that when the low-pressure generating unit is arranged therein, this low-pressure generating unit does not project beyond the dimensions of the recess and thus also of the freshness-preserving container and is thus in effect arranged countersunk. This recess is preferably embodied in the shell of the freshness-preserving container.

In one advantageous embodiment the low-pressure generating unit is arranged below the shell. In this respect it can be arranged on a base of the shell for instance.

Provision can also be made for the low-pressure generating unit to be arranged laterally adjacent to a side wall of the shell, viewed in the horizontal direction, in particular resting against this side wall.

An individual freshness-preserving container can, as required, be created by these alternative embodiments.

Provision is preferably made, in one exemplary embodiment, for the actuation element to be accessible from the front of the freshness-preserving container and exposed and this actuation element can thus, in effect, be actuated across a front of the freshness-preserving container.

In this respect provision can be made, in one exemplary embodiment of a freshness-preserving container, for this actuation element to be arranged as a pusher which can be gripped by a user, wherein as a function of a movement of the actuation element initiated by a user, air can then automatically be suctioned out of the freshness-preserving container and thus out of the volume delimited by the shell and the cover arranged thereupon to form a seal. If this actuation element is then actuated in turn in the opposite direction, guided by a user, the generated low-pressure or the reduced air pressure is thus raised again and air is in effect then introduced into the freshness-preserving container. This is also carried out exclusively by the mechanically operating low-pressure generating unit.

Provision can also be made for the low-pressure generating unit to be arranged at a certain distance from and thus in a contactless or contact-free manner with the shell and/or the cover, and to be connected via a particularly flexible air pipe to an opening, in particular in the shell, in order then to permit the suctioning-in of the air. This embodiment is then advantageous if the volume of the freshness-preserving container for receiving the food is to remain unchanged and in this respect there is no recess, as was cited and explained above, present for instance.

An embodiment of this type with a longer air pipe is also advantageous if, when a freshness-preserving container is used in a domestic refrigerator, a directly adjacent and contacting support of the low-pressure generating unit on the shell and/or the cover is not possible on account of the installation space.

Provision is preferably made for the freshness-preserving container to have a display unit, which is arranged on the shell and/or the cover and which is embodied to display the air pressure in the freshness-preserving container. The display can be carried out here for instance using unchangeable symbols arranged in a fixed position, which are applied as printing for instance. The respectively set air pressure in the freshness-preserving container can then be identified as a function of the respective position of the actuation element relative to these elements or symbols attached in a fixed position. An electronic display can however also be carried out, in which the air pressure is detected using a sensor for instance, and then correspondingly indicated on a display of the display unit.

Furthermore, the invention relates to a domestic refrigerator with a receiving compartment for food, in which an inventive freshness-preserving container or an advantageous embodiment thereof is arranged.

In an advantageous embodiment, the freshness-preserving container is arranged in the receiving compartment so as to be removable in a non-destructive manner.

The shell of the freshness-preserving container is preferably displaceable relative to the receiving compartment in the state mounted in the receiving compartment and the low-pressure generating unit is coupled to the shell such that as a function of the movement of the shell, the actuation element of the low-pressure generating unit is automatically actuated, in particular exclusively mechanically actuated. On account of this embodiment, an automatism for low-pressure generation is in effect generated by the movement of a component of the freshness-preserving container, namely the shell itself, without a user having to directly grip and move the actuation element. As a result, this low-pressure generation for the required storage of the food cannot be forgotten and in this respect thus has corresponding advantages compared to embodiments in which the actuation element has to be actively directly actuated by a user him/herself and displaced in order to be able to generate the low pressure.

Provision is preferably made for a piston of the low-pressure generating unit to be arranged in a fixed position in the receiving compartment and a piston housing of the low-pressure generating unit receiving the piston to be connected in a fixed position with the shell, wherein the piston housing can be displaced relative to the piston as a function of the movement of the shell and air can as a result be suctioned in or blown in from the freshness-preserving container. This is a very advantageous specification since in effect the fixed mounting of the piston causes this not to tilt or brace and the larger and more stable piston housing is connected to the shell and moved therewith so that the position fixing and relative displacement in respect of the piston is also permitted here if required.

Provision can be made for the cover of the freshness-preserving container to be lifted off the shell as a complete part or only a subarea of the cover, for instance as a flap, is embodied, which can then be moved relative to the shell. Provision is advantageously made for additional connecting elements to be provided, for instance latching elements, for the placement of the cover on the shell to form seal, in order to optimize the mechanically stable and sealing fit of the cover on the shell. At least the shell is preferably embodied from a thin-walled and/or transparent plastic material.

Further features of the invention become apparent from the claims, the figures and the description of the figures. All the features and combinations of features cited above in the description and the features and combinations of features cited below in the description of the figures and/or shown alone in the figures cannot only be used in the respectively specified combination, but instead also in other combinations or however alone without departing from the scope of the invention. Embodiments of the invention which are not shown and explained explicitly in the figures are thus also to be regarded as included and disclosed but become apparent and can be generated by separated combinations of features from the embodiments shown.

BRIEF DESCRIPTION OF THE SEVERAL VIEWS OF THE DRAWING

Exemplary embodiments of the invention are explained in more detail below on the basis of schematic drawings, in which.

Elements which are the same or have the same function are provided with the same reference characters in the figures.

DESCRIPTION OF THE INVENTION

Figure 1:
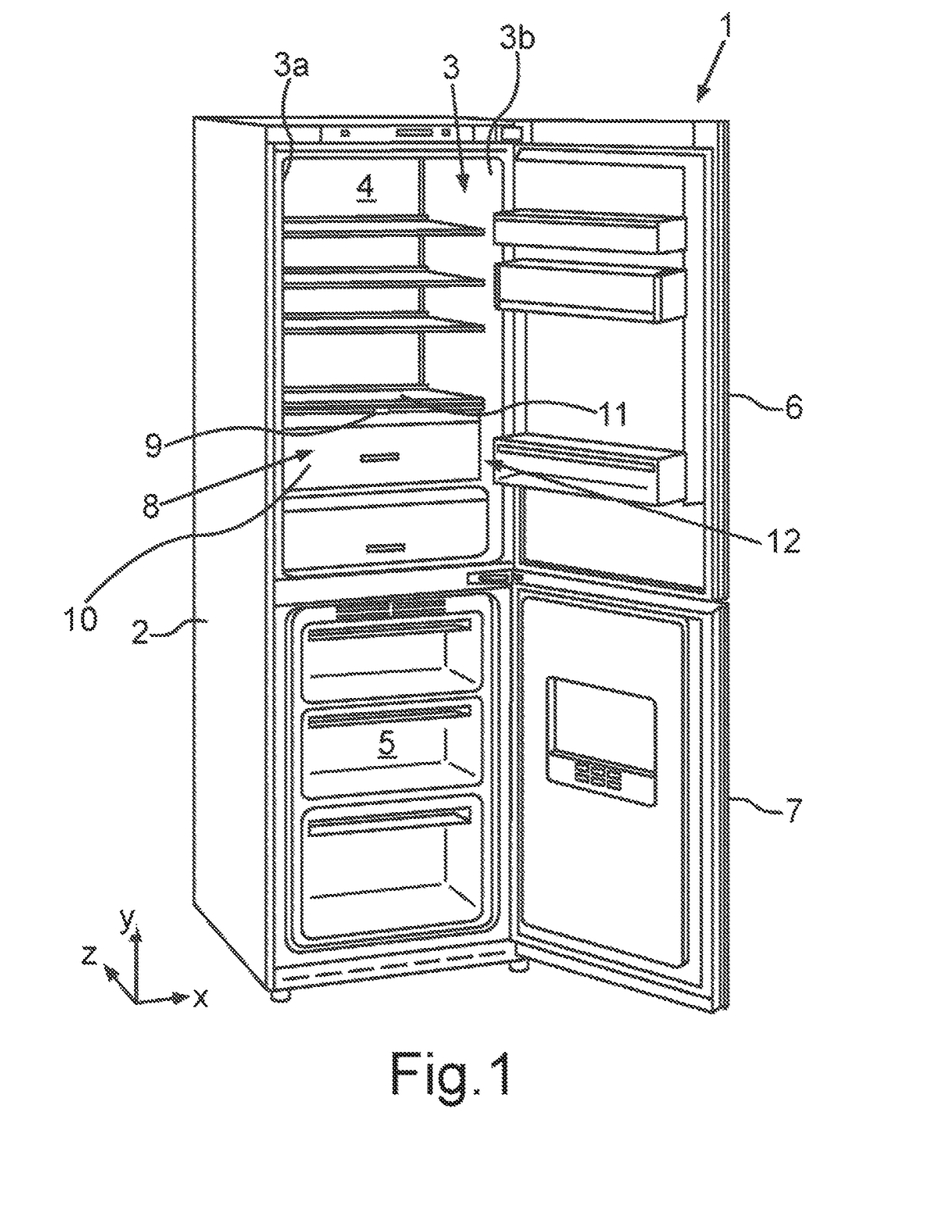
FIG. 1 shows a perspective representation of an exemplary embodiment of an inventive domestic appliance.

FIG. 1 shows an exemplary representation of a domestic refrigerator 1 which is embodied as a fridge-freezer. The domestic refrigerator 1 comprises a carcass 2 with an inner container 3. The inner container 3 delimits, with its walls, a first interior or receiving compartment 4, which is a refrigerating compartment and a second interior or receiving compartment 5, which is a freezer compartment, which is arranged therebelow for instance, and is separated therefrom. The receiving compartment 4 serves generally for the frost-free cooling of refrigerated goods, preferably at temperatures between +4° C. and +8° C. The receiving compartment 4 can however also be embodied as a zero-degree compartment, in particular for keeping fruit and vegetables fresh. The receiving compartment 4 is accessible when the door 6, which closes the receiving compartment 4 from the front, is open.

The further receiving compartment 5 serves generally to deep freeze frozen goods at −18° C. for instance. The receiving compartment 5 is accessible when the freezer compartment door 7 is open.

A refrigerated goods or freshness-preserving container 8, which has a cover 9 and a drawer or tray 10, is removably mounted in the upper receiving compartment 4.

An additional covering 11 in the form of a separating wall for instance, for instance a glass compartment base, can be arranged above the cover 9, as shown.

The inner container 3 has inter alia two opposing vertical side walls 3a and 3b.

The freshness-preserving container 8 is separated from the rest of the remaining subvolume of the receiving compartment 4 at least by means of the covering 11. The freshness-preserving container 8 is embodied to receive food and comprises a low-pressure generating unit 12 which operates exclusively mechanically, such as is explained below on the basis of specific exemplary embodiments. The low-pressure generating unit 12 is used to adjust an air pressure that is reduced compared to the surrounding area outside of the freshness-preserving container 8 and thus for instance also the receiving compartment 4. The low-pressure generating unit 12 to this end comprises an actuation element, which can be moved relative to the freshness-preserving container 8 and wherein as a function of the movement of the actuation element, air can be suctioned out of the freshness-preserving container 8 and thus of the volume which is delimited by the shell 10 and the cover 9.

The freshness-preserving container 8 can be detachably removed from the receiving compartment 4 in a non-destructive manner. Also in the state introduced into the receiving compartment 4, provision is made for the shell 10 to be moved to and fro in the depth direction and thus in the z-direction in the state still mounted in the receiving compartment 4, in order to be able to reach the interior of the shell 10.

Figure 2:
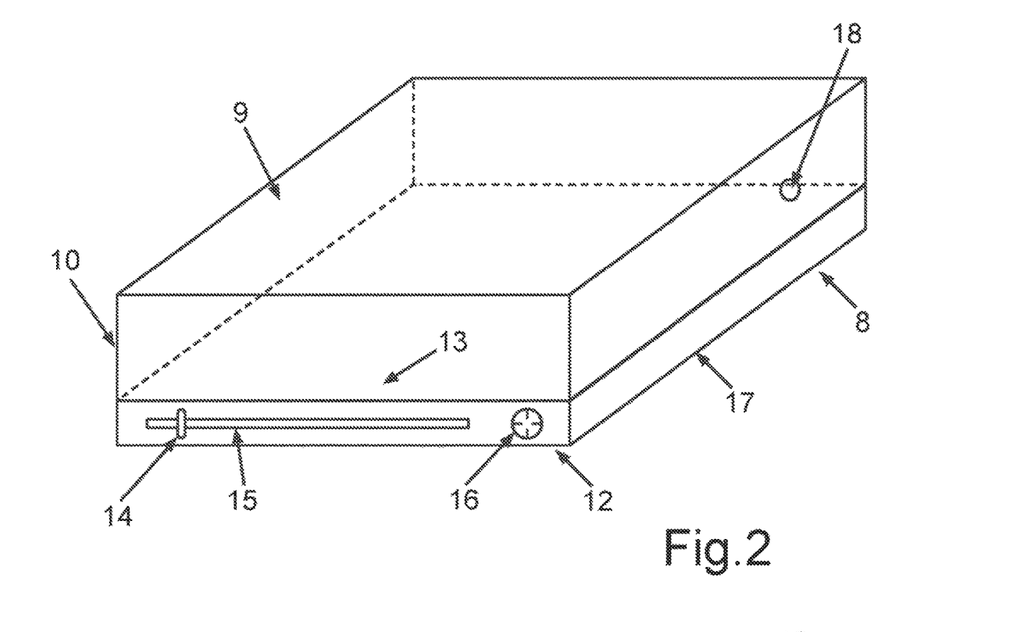
FIG. 2 shows a perspective representation of an exemplary embodiment of an inventive freshness-preserving container.

FIG. 2 shows a perspective representation of an exemplary embodiment of a freshness-preserving container 8. In this embodiment, provision is made for the low-pressure generating unit 12 to be arranged below the shell 10 and in this context resting against a base 13 of the shell 10. An actuation element 14 embodied as a pusher is accessible from the front and can be gripped by a user and moved horizontally and in a straight line along a displacement link 15. This user-initiated and manually performed displacement movement of the actuation element 14 causes air to be suctioned out of the freshness-preserving container 8 by means of the mechanically operating low-pressure generating unit 12 and thus generates a reduced air pressure therein. If the actuation element 14 is then in turn moved in the opposite direction, air is introduced into the volume of the freshness-preserving container 8 and the reduced air pressure is increased again.

Furthermore, provision is made for the freshness-preserving container 8 to have a display unit 16, by means of which the air pressure generated in the freshness-preserving container 8 by the low-pressure generating unit 12 can be displayed. This can be carried out symbolically or on a value basis.

In the exemplary embodiment in FIG. 1, provision is made in particular for the actuation element 14 to have a piston or to be a piston, which is displaceably mounted in an actuation element housing 17, which is a piston housing here, which cannot be seen in FIG. 2 and is arranged in the housing associated with the low-pressure generating unit 12. This actuation element housing 17 has a fluidic connection with the interior of the freshness-preserving container 8, which is delimited by the shell 10 and the cover 9, wherein an opening 18 is provided here. The low-pressure generating unit 12 operates according to the principle of an air pump.

Provision is preferably made for the cover 9 to be arranged in its state placed on the shell 10 to form a seal and in particular is additionally connected with fastening elements, for instance latching elements, to the shell 10.

Figure 3:
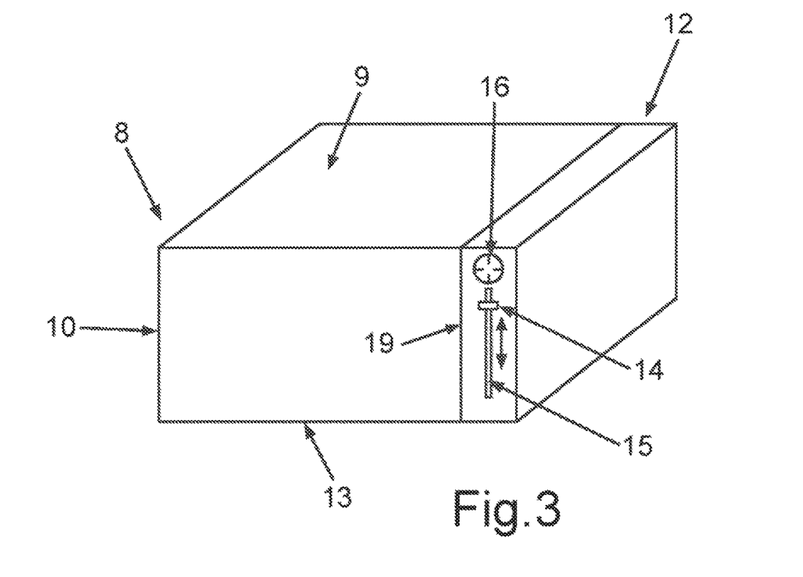
FIG. 3 shows a perspective representation of a further exemplary embodiment of an inventive freshness-preserving container.

FIG. 3 shows a perspective representation of a further exemplary embodiment of the freshness-preserving container 8. Contrary to the representation according to FIG. 2, provision is made here for the low-pressure generating unit 12 not to be arranged here below the base 13, but instead to be arranged nearby to and resting or abutting against a vertical side wall 19 of the shell 10.

Figures 4, 5, 6:
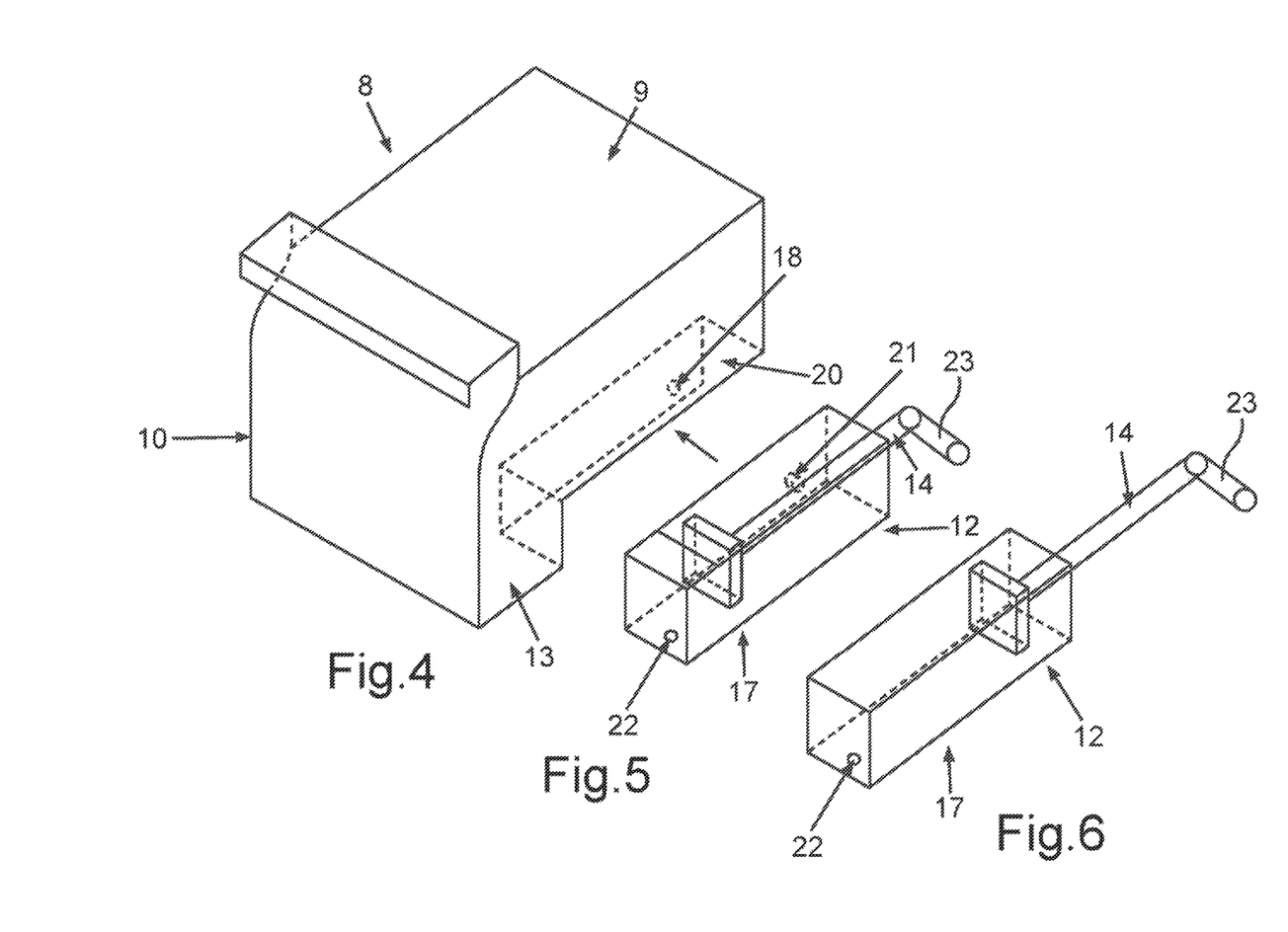
FIG. 4 shows a perspective sectional representation of a further exemplary embodiment of an inventive freshness-preserving container with a removed low-pressure generating unit.
FIG. 5 shows an exemplary representation of a low-pressure generating unit for attachment to the freshness-preserving container according to FIG. 4, in which the low-pressure generating unit is shown in a first operating position.
FIG. 6 shows a representation of the low-pressure generating unit according to FIG. 5 in a second operating position which differs from FIG. 5.

FIG. 4 shows a further exemplary embodiment, wherein it is apparent here in a perspective sectional representation that an indentation or recess 20 is embodied in the base 13 of the shell 10. The low-pressure generating unit 12 shown by way of example in a first operating position in FIG. 5 can be inserted with an accurate fit and mechanically fastened herein. The low-pressure generating unit 12 here comprises the actuation element 14 embodied as a piston, which is arranged linearly in the actuation element housing 17 and is thus displaceable in a straight line. A coupling 21 is arranged on the actuation element housing 17, which is designed to connect to the opening 18 with an accurate fit and in a sealing manner. Furthermore, the actuation element housing 17 comprises an outlet opening 22. FIG. 5 shows an operating state of the low-pressure generating unit 12, in which the piston, in the form of the actuation element 14, is arranged in a first end position, which is reached when the drawer 10 is inserted entirely in the receiving compartment 4.

Provision is preferably made in this embodiment for the actuation element 14 to be arranged in a fixed position in the receiving compartment 4 and for instance to be in a fixed position on a wall of the inner container 3 by way of a connecting element 23 for instance. On the other hand, provision is made in particular for the actuation element housing 17 to be arranged in a fixed position on the shell 10 in the state arranged in the recess 20. The possible relative movement between the actuation element 14 and the actuation element housing 17 is in the linear direction in particular in the depth direction and thus in the z-direction, in which only the shell 10 can move in the receiving compartment 4. This parallelity of the movement options automatically causes a relative movement also between the actuation element housing 17 and the stationary actuation element 14 if the shell 10 with the already attached and closed cover 9 is inserted into the receiving compartment 4 in the positive z direction. As a result, on account of the air pump principle of the low-pressure generating unit 12, air is then automatically suctioned out of the volume of the freshness-preserving container 8 by the pump effect, so that when the shell 10 and cover 9 are inserted into the receiving compartment 4, the reduced air pressure in the interior of this module is also automatically generated.

If this module with the shell 10 and the cover 9 is then removed again from the receiving compartment 4, on account of the relative movement which is in turn automatically carried out between the actuation element housing 17 and the actuation element 14, air is blown in and the reduced air pressure in the freshness-preserving container 8 is thus increased again. When the reduced air pressure is generated, the suctioned air is in the process purged via the opening 22 in the actuation element housing 17, on the other hand in accordance with the representation in FIG. 6, when air is being blow into the volume of the freshness-preserving container 8, the air is suctioned into the low-pressure generating unit 12 from the outside, in particular from the receiving compartment 4, by way of the opening 22.

Figure 7:
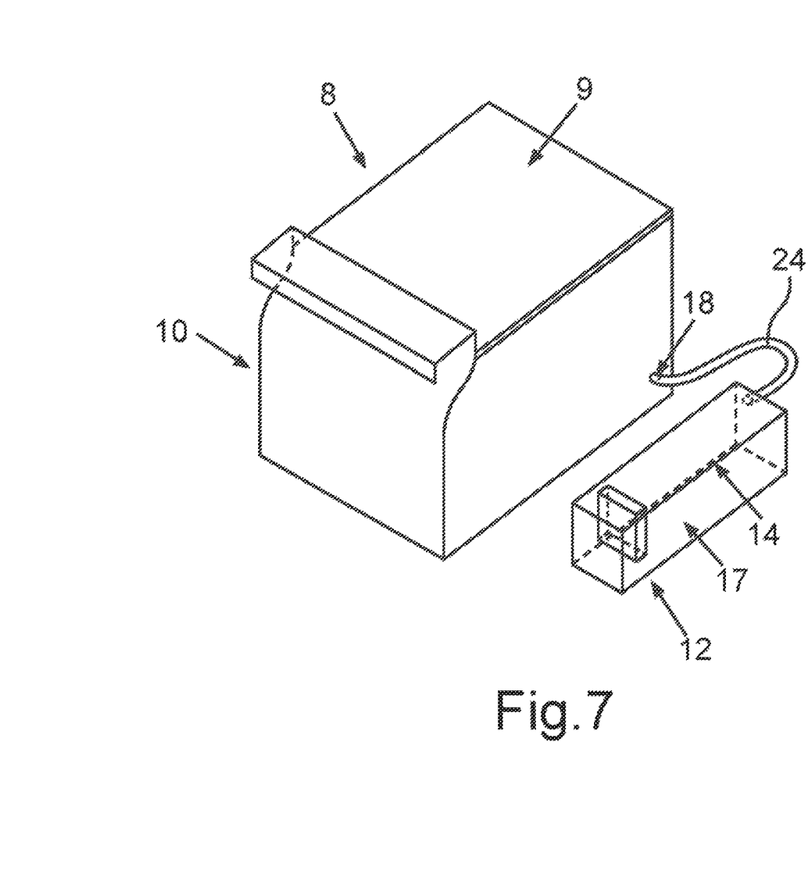
FIG. 7 shows a perspective representation of a further exemplary embodiment of an inventive freshness-preserving container.

An exemplary embodiment of the freshness-preserving container 8 is shown in a further perspective sectional representation in FIG. 7, in which a low-pressure generating unit 12 is arranged not directly and immediately resting against the shell 10 and/or the cover 9, but is instead arranged at a distance therefrom and by way of an air pipe 24 reaches a fluidic coupling with the opening 18 and thus also the interior volume, which is delimited by the shell 10 and the cover 9.

Figure 8:
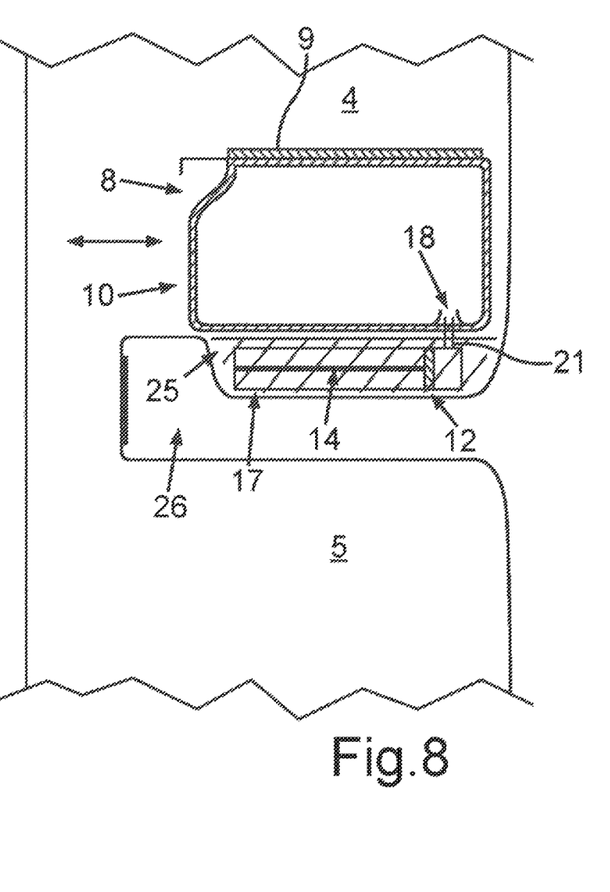
FIG. 8 shows a schematic vertical sectional representation through a further exemplary embodiment of an inventive domestic refrigerator.

FIG. 8 shows a rough vertical sectional representation and thus in the y-z plane a further exemplary embodiment of a domestic refrigerator 1. In this embodiment, a low-pressure generating unit 12 is arranged embedded in a fixed position in a depression 25 in a separating wall 26, which separates the receiving compartment 4 from the receiving compartment 5. In this embodiment, with a relative movement, for instance when the shell 10 with the cover 9 is pulled out, a decoupling of the low-pressure generating unit 12 is generated. In a defined position, the decoupling is performed.

On the other hand, when the shell 10 with the cover 9 is pushed in, this coupling is automatically generated again. In particular, with this exemplary embodiment, provision is made for no automatic generation of the reduced air pressure to be carried out, but instead a user in turn generates reduced air pressure by manual actuation of the low-pressure generating unit 12, for instance by displacing the actuation element 14.

Provision can very generally be made for a reduction in the air pressure in the interior of the module comprising the shell 10 and the cover 9 to be carried out by pressing or pushing or pulling or rotating or ratcheting the actuation element 14.

Provision is preferably made in all embodiments except for the example in FIG. 4 to FIG. 6 that with a user-actuated implementation of the low-pressure generating unit 12, with which the user grips the actuation element 14 directly and moves the same, the value of the reduced air pressure can also be set on a very user-individual basis. The extent to which the user moves the actuation element 14 causes the air pressure to be reduced to a greater or lesser degree.

Provision can also be made for exemplary embodiments, such as were explained, to be combined. For instance, in addition to the embodiment according to FIG. 4 to FIG. 6, provision can be made for the user then also additionally to provoke a further reduction in the air pressure by directly gripping the actuation element 14.

LIST OF REFERENCE CHARACTERS 1 domestic refrigerator
2 carcass
3 inner container
3a vertical side wall
3b vertical side wall
4 receiving compartment
5 receiving compartment
6 door
7 freezer compartment door
8 freshness-preserving container
9 cover
10 shell
11 covering
12 low-pressure generating unit
13 base
14 actuation element
15 displacement link
16 housing
17 actuation element housing
18 opening
19 vertical side wall
20 recess
21 coupling 22 outlet opening
23 connecting element
24 air pipe
25 depression
26 separating wall

The invention claimed is:

1. A freshness-preserving container for food, the freshness-preserving container comprising:
 a shell defining a front of the freshness-preserving container;
 a cover configured to be placed on and sealed to said shell; and
 a mechanically operating low-pressure generating unit for adjusting an air pressure in the freshness-preserving container being reduced as compared to an air pressure in a surrounding area outside of the freshness preserving container;
 said low-pressure generating unit having an actuation element being movable relative to the freshness-preserving container for suctioning air out of the freshness-preserving container as a function of a movement of said actuation element;
 said actuation element being accessible from said front of the freshness-preserving container and being configured to be actuated across said front of the freshness-preserving container; and
 said actuation element being constructed as a pusher to be gripped by a user, causing air to be automatically suctioned out of the freshness-preserving container as a function of a movement of said actuation element initiated by the user.

2. The freshness-preserving container according to claim 1, wherein said actuation element of said low-pressure generating unit is a linearly displaceable piston.

3. The freshness-preserving container according to claim 1, wherein:
 said low-pressure generating unit is a mechanically operating pump having an actuation element housing; and
 said actuation element is a piston being moveably mounted in said actuation element housing for suctioning air out of the freshness-preserving container as a function of a displacement of said piston.

4. The freshness-preserving container according to claim 1, wherein said low-pressure generating unit is integrated into said shell of the freshness-preserving container.

5. The freshness-preserving container according to claim 1, wherein said low-pressure generating unit is non-destructively detachable and removable from the freshness-preserving container.

6. The freshness-preserving container according to claim 1, wherein said shell of the freshness-preserving container has a recess formed therein, and said low-pressure-generating unit is received in said recess.

7. The freshness-preserving container according to claim 1, wherein said shell has dimensions, and said low-pressure-generating unit in said recess does not project from said dimensions of said shell.

8. The freshness-preserving container according to claim 1, wherein said low-pressure generating unit is disposed below said shell.

9. The freshness-preserving container according to claim 1, wherein said shell has a side wall, and said low-pressure generating unit is disposed laterally adjacent said side wall of said shell.

10. The freshness-preserving container according to claim 1, which further comprises an air pipe connecting said low-pressure generating unit to an opening in said shell.

11. The freshness-preserving container according to claim 1, which further comprises a display unit disposed on at least one of said shell or said cover for displaying the air pressure in the freshness-preserving container.

12. A domestic refrigerator, comprising:
 a receiving compartment for food; and
 a freshness-preserving container according to claim 1 disposed in said receiving compartment.

13. The domestic refrigerator according to claim 12, wherein said freshness-preserving container is non-destructively removable from said receiving compartment.

14. The domestic refrigerator according to claim 12, wherein:
 said shell of said freshness-preserving container is configured to be displaced in and relative to said receiving compartment;
 said low-pressure generating unit is coupled to said shell; and
 said actuation element of said low-pressure generating unit is automatically actuated a function of the displacement of said shell.

15. The domestic refrigerator according to claim 14, wherein:
 said actuation element of said low-pressure-generating unit is a piston disposed in a fixed position in said receiving compartment;
 said low-pressure-generating unit has an actuation element housing connected to said shell in a fixed position, said actuation element housing receiving said actuation element; and
 said actuation element housing is configured to be displaced relative to said actuation element as a function of the displacement of said shell resulting in air being suctioned from said freshness-preserving container.

* * * * *